US011891281B2

(12) United States Patent
Grimaud et al.

(10) Patent No.: US 11,891,281 B2
(45) Date of Patent: Feb. 6, 2024

(54) CONTROL METHOD FOR CONTROLLING LIFTING OF A HANGING LOAD IN CASE OF EMERGENCY STOP

(71) Applicant: MANITOWOC CRANE GROUP FRANCE, Dardilly (FR)

(72) Inventors: Simon Grimaud, Lyons (FR); Philippe Combris, Dieme (FR)

(73) Assignee: MANITOWOC CRANE GROUP FRANCE, Dardilly (FR)

( * ) Notice: Subject to any disclaimer, the term of this patent is extended or adjusted under 35 U.S.C. 154(b) by 155 days.

(21) Appl. No.: 17/681,691

(22) Filed: Feb. 25, 2022

(65) Prior Publication Data

US 2022/0371861 A1 Nov. 24, 2022

(30) Foreign Application Priority Data

Feb. 23, 2021 (FR) ...................................... 2101736

(51) Int. Cl.
*B66D 1/40* (2006.01)
*B66D 1/48* (2006.01)
*B66D 1/54* (2006.01)

(52) U.S. Cl.
CPC ............... *B66D 1/485* (2013.01); *B66D 1/54* (2013.01)

(58) Field of Classification Search
CPC . B66D 1/485; B66D 1/54; B66D 1/58; B66D 1/12; B66C 1/40; B66C 13/16; B66C 13/23; B66C 13/26; B66C 13/44; B66C 13/50; B66C 13/52; B66C 15/065; B66C 23/905
See application file for complete search history.

(56) References Cited

U.S. PATENT DOCUMENTS

2019/0084809 A1* 3/2019 Claeys .................... B66C 23/90
2019/0112163 A1* 4/2019 Grimaud .................. B66C 1/34

FOREIGN PATENT DOCUMENTS

| | | | |
|---|---|---|---|
| CN | 106586865 | A | 4/2017 |
| CN | 105438983 | B | 5/2017 |
| WO | 2004048249 | A1 | 6/2004 |
| WO | 2019222243 | A1 | 11/2019 |

* cited by examiner

*Primary Examiner* — Emmanuel M Marcelo
(74) *Attorney, Agent, or Firm* — Cook Alex Ltd.

(57) ABSTRACT

A method for controlling lifting of a hanging load using a lifting winch integrating a drum on which a lifting rope is wound coupled to the load, includes measuring a mass parameter and a lifting speed representative of a mass and of a displacement speed of the load and supervising an emergency stop which, once activated, shuts off the lifting winch. The method also includes, during an ascending of the load, comparing the lifting speed with a low threshold and a high threshold which vary according to the mass parameter, and monitoring lifting in an optimized mode in which the lifting speed when ascending is authorized below the high threshold and forbidden above the high threshold, and if the emergency stop is activated during an ascending and while the lifting speed is higher than the low threshold then an alarm is activated.

22 Claims, 2 Drawing Sheets

Basic mode

CONTROL METHOD FOR CONTROLLING LIFTING OF A HANGING LOAD IN CASE OF EMERGENCY STOP

FIELD

The invention relates to a control method for controlling lifting of a hanging load by means of a lifting winch integrating a drum on which is wound a lifting rope coupled to the hanging load.

More particularly, it relates to a control method which aims at avoiding faulty winding of the lifting rope which might happen when an emergency stop is activated during an ascending of the hanging load.

BACKGROUND

In a known manner, a lifting winch, also called rope winch, comprises a rope drum around which is wound a lifting rope, wherein the drum is driven in rotation by means of a motor in two opposite rotational directions for winding/unwinding the lifting rope on the drum, thereby controlling lifting of the hanging load when rising or descending.

The invention finds a non-limiting application for a crane-type lifting apparatus, and in particular a tower crane, a crane mounted in elements, a self-erecting crane, a port crane and a mobile crane. In a crane application, the hanging load generally hangs on a jib, and in particular on a dispensing trolley moving along such a jib, to make it ascend and descend relative to the jib.

The invention also finds application in transport apparatuses such as cable cars and elevators, and in other types of lifting apparatuses such as gantries.

In order to improve the productivity of the load lifting operations, it is by now known to use lifting winches of the high-performance lifting type, called "HPL", which, in comparison with the previous generation winches, allow having very high lifting speeds at low load when rising or descending, such as for example a lifting speed in the range of 200 m/min and even beyond.

However, the applicant has noticed that, if during an ascending of the hanging load (and therefore during a winding of the lifting rope on the drum), an emergency stop is activated and that consequently the lifting winch is shut off (thereby stopping the ascending of the hanging load), then faulty winding of the lifting rope on the drum might occur. Indeed, an abrupt stoppage of the rotation of the drum, during a phase of winding the lifting rope, could lead, with the inertia of the lifting rope (in particular at high speed), to a wound portion of the lifting rope being detached off the drum and/or scattering unevenly. Ultimately, such faulty winding could degrade the state of the lifting rope, and could be detrimental to the reliability of the lifting operations.

SUMMARY

Thus, the invention suggests solving this problem by controlling lifting of the load, in particular during the load ascending phases, at least to warn on a risk of faulty winding, so that a check-up of the winding could be implemented (for example a visual check-up) and, wherein appropriate, an unwinding of the lifting rope to recover and suppress the faulty winding, and possibly to avoid that such a faulty winding happens.

To this end, the invention provides a control method for controlling lifting of a hanging load by means of a lifting winch integrating a drum on which is wound a lifting rope coupled to the hanging load, this control method implementing the following steps:

- measuring of a mass parameter representative of a mass of the hanging load;
- measuring of a lifting speed representative of a displacement speed of the hanging load, when ascending or descending, and comprised within a speed range bound by a maximum speed;
- supervision of an emergency stop which, once activated, shuts off at least the lifting winch and stops lifting of the hanging load and which, once deactivated, authorizes a reactivation of the lifting winch;
- during an ascending of the hanging load, comparison of the lifting speed when ascending with a low threshold which varies according to the mass parameter, and with a high threshold which also varies according to the mass parameter, said high threshold being higher than or equal to the low threshold and lower than or equal to the maximum speed;
- monitoring of the lifting in an optimized mode in which the lifting speed when ascending is authorized only below the high threshold and forbidden above the high threshold, and if the emergency stop is activated during an ascending of the hanging load and while the lifting speed when ascending is higher than the low threshold then an alarm is activated.

Thus, the invention provides an optimized mode in which, during an ascending of the hanging load, the lifting speed when ascending is restrained to the extent that it cannot exceed the high threshold; this high threshold depending on the mass of the load and being a threshold beyond which the risk of a faulty winding is very high, and the faulty winding could be such that it cannot be recovered, even when unwinding the lifting rope. Thus, this restriction avoids such a non-recoverable faulty winding happening.

Moreover, in this optimized mode, during an ascending of the hanging load, if the lifting speed when ascending is higher than the low threshold, then the alarm is activated, this low threshold depending on the mass of the load and being a threshold beyond which the risk of a faulty winding is high, with a faulty winding that is preferably recoverable by unwinding the lifting rope. Thus, the alarm informs that it is necessary to check up whether there is a faulty winding and, wherein appropriate, that it is necessary to recover this faulty winding by unwinding the lifting rope.

It should be noted that the mass parameter could correspond to the mass of the hanging load, or still to another parameter that depends on the mass of the hanging load, such as for example a weight, a tension, a force, a stretching, etc.

It should also be noted that the lifting speed could correspond to the displacement speed of the hanging load, or still to another speed that depends on the displacement speed of the hanging load, such as for example a rotational speed of the drum, a motor speed, a speed of the lifting rope, etc.

According to one feature, in the optimized mode, once the emergency stop is deactivated, and if the lifting speed when ascending was higher than the low threshold at the time of activation of the emergency stop, then the lifting speed when ascending, and also optionally the lifting speed when descending, is limited to a reduced speed, lower than the high threshold, until a winding condition is met, said winding condition being representative of a wound/unwound state of the lifting robe around the drum.

In this manner, after a reactivation of the lifting winch, which follows an emergency stop during an ascending of the hanging load at a lifting speed when ascending higher than the low threshold, the lifting speed is restrained to the reduced speed to promote a recovery of a faulty winding that might occur, by unwinding the lifting rope, and also avoid worsening of the faulty winding. Afterwards, it is only once the winding condition is met, that the lifting speed could be unwound (that is to say could exceed the reduced speed) in order to be able to resume the load lifting operations.

This winding condition reflects the absence of a faulty winding, either because no faulty winding has happened at the time of emergency stop, or because the faulty winding has been recovered after reactivation of the lifting winch. This winding condition could be subject to validation, either by an operator who performs a visual check-up, or automatically or remotely, for example by means of a dedicated sensor.

In one variant, in the optimized mode, once the emergency stop is deactivated, and if the lifting speed when ascending was higher than the low threshold at the time of activation of the emergency stop, then the lifting speed when ascending is again authorized only below the high threshold and forbidden above the high threshold, unless another operating mode is selected.

In other words, in this variant, the lifting speed, when rising or descending, is not restrained to the reduced speed after deactivation of the emergency stop, and also no winding condition is to be assessed; only the alarm is activated before a return to normal operation in this variant of the optimized mode.

According to one possibility, the winding condition is met once the lifting cable is unwound by a definite unwound length after deactivation of the emergency stop.

This unwound length corresponds to a minimum length for recovering a faulty winding, and could be derived from a calculation, a simulation, a series of empirical tests, or a check-up by an operator.

According to another possibility, the unwound length depends on at least one of the following parameters among the lifting speed when ascending at the time of activation of the emergency stop and the mass parameter.

In other words, this unwound length depends on the lifting speed when ascending at the time of activation of the emergency stop and/or on the mass parameter.

According to one feature, once the winding condition is met in the optimized mode, the alarm is deactivated.

According to another feature, once the winding condition is met in the optimized mode, the lifting speed when ascending is again authorized only below the high threshold and forbidden above the high threshold, unless another operating mode is selected.

In a particular embodiment, when the mass parameter is lower than a definite reference value, the low threshold and the high threshold are distinct and they increase with the mass parameter.

In other words, when the mass parameter is low (that is to say lower than the reference value), there will be three speed areas, below the low threshold, between the low threshold and the high threshold and above the high threshold. However, exceptions to this case could be considered, for example depending on the lifting rope type and/or the lifting winch model.

In a particular embodiment, when the mass parameter is higher than the reference value, the low threshold and the high threshold are equal, they decrease with the mass parameter.

In other words, when the mass parameter is high (that is to say higher than the reference value), there will be two speed areas, below the low threshold and above the high threshold; this low threshold being equivalent to the high threshold.

According to one possibility, the maximum speed varies according to the mass parameter and, when the mass parameter is higher than the reference value, the maximum speed decreases with the mass parameter and the low threshold and the high threshold are equal to this maximum speed.

According to another possibility, when the mass parameter is lower than the reference value, the maximum speed is constant or constant within a 15% margin and the high threshold is strictly lower than the maximum speed or is equal to the maximum speed.

Advantageously, the reduced speed, in the optimized mode, is lower than the low threshold.

According to one variant, the reduced speed, in the optimized mode, is comprised between 0.1 and 0.6 times the maximum speed, and for example between 0.2 and 0.4 times the maximum speed.

In an advantageous embodiment, the alarm is in the form of a visual or audible alarm signal on a control interface.

In a particular embodiment, a step of selecting an operating mode amongst the optimized mode and a basic mode in which the lifting speed when ascending is authorized over the entire speed range, and if an emergency stop is activated during an ascending of the hanging load and while the lifting speed when ascending is higher than the low threshold then an alarm is activated; and the monitoring of the lifting is performed in the selected operating mode.

This basic mode corresponds to operation without restraining the lifting speed, yet with an alarm if an emergency stop is activated during an ascending of the hanging load with a lifting speed when ascending higher than the low threshold, to inform that it is necessary to check up whether there is a faulty winding; because, for recall, the low threshold is a threshold beyond which the risk of faulty winding is high.

Advantageously, in the basic mode, the alarm varies depending on whether the lifting speed when ascending is lower than the high threshold or is higher than the high threshold at the time of activation of the emergency stop.

In other words, in the basic mode, the alarm, whether audible or visual, depends on whether the lifting speed when ascending is located between the low threshold and the high threshold or the lifting speed when ascending is located above the high threshold, in order to warn an operator about a risk of considerable (or minor) yet recoverable faulty winding (the case wherein the lifting speed when ascending is lower than the high threshold) or a risk of very considerable (or major) and even non-recoverable faulty winding (the case wherein the lifting speed when ascending is higher than the high threshold).

In another particular embodiment, a step of selecting an operating mode amongst the optimized mode and a safe mode in which the lifting speed when ascending is authorized only below the low threshold and forbidden above the low threshold is performed; and the monitoring of the lifting is performed in the selected operating mode.

This safe mode corresponds to an operation with a restriction of the lifting speed when ascending below the low threshold, to the extent that this lifting speed when ascending cannot exceed the low threshold; thereby avoiding a (recoverable or non-recoverable) faulty winding happening.

Of course, it is possible to consider operating a step of selecting an operating mode amongst the optimize mode, the basic mode and the safe mode, and the lifting monitoring is operated in the operating mode selected amongst the three.

Advantageously, during monitoring of the lifting, the lifting speed when descending is authorized over the entire speed range.

In other words, in the optimized mode, and even in the other operating modes such as the basic mode and the safe mode, the lifting speed when descending is not restrained and could be operated over the entire speed range, in other words up to the maximum speed.

Indeed, in case of emergency stop during a high-speed descent, the risk of faulty winding is not observed, only the ascending is problematic, at least with regards to this faulty winding matter.

The invention also relates to a lifting or transport apparatus, such as for example a crane, comprising a lifting winch integrating a drum on which is wound a lifting rope coupled to a hanging load for lifting of the hanging load, this lifting or transport apparatus comprising:

- a first measuring system for measuring a mass parameter representative of a mass of the hanging load;
- a second measuring system for measuring a lifting speed representative of a displacement speed of the hanging load, when ascending or descending, and comprised within a speed range bound by a maximum speed;
- an emergency stop which, once activated shuts off at least the lifting winch and stops lifting of the hanging load and which, once deactivated, authorizes a reactivation of the lifting winch;
- an alarm system configured to emit an alarm when activated; and
- a monitoring/control system connected to the first measuring system, to the second measuring system, to the lifting winch, to the alarm system and to the emergency stop, said monitoring/control system being configured to perform, during an ascending of the hanging load, a comparison of the lifting speed when ascending with a low threshold which varies according to the mass parameter, and with a high threshold which also varies according to the mass parameter, said high threshold being higher than or equal to the low threshold and lower than or equal to the maximum speed; and
- wherein the monitoring/control system is configured, in an optimized mode, to control the lifting winch so that the lifting speed when ascending is authorized only below the high threshold and is forbidden above the high threshold, and to activate the alarm system if the emergency stop is activated during an ascending of the hanging load and while the lifting speed when ascending is higher than the low threshold.

According to one feature, the monitoring/control system is configured, in the optimized mode and once the emergency stop is deactivated, to control the lifting winch so that the lifting speed, whether when ascending or descending, is limited to a reduced speed, lower than the high threshold, until a winding condition is met, said winding condition being representative of a wound/unwound state of the lifting cable around the drum.

According to one feature, the lifting or transport apparatus comprises a mode selector for selecting an operating mode amongst the optimized mode and a basic mode in which the monitoring/control system controls the lifting winch so that the lifting speed when ascending is authorized over the entire speed range, and for activating the alarm system if an emergency stop is activated during an ascending of the hanging load and while the lifting speed when ascending is higher than the low threshold.

According to another feature, the lifting or transport apparatus comprises a mode selector to select an operating mode amongst the optimized mode and a safe mode in which the monitoring/control system controls the lifting winch so that the lifting speed when ascending is authorized only below the low threshold and forbidden above the low threshold.

BRIEF DESCRIPTION OF THE DRAWINGS

Other features and advantages of the present invention will appear upon reading the detailed description hereinafter, of a non-limiting example of implementation, made with reference to the appended figures in which.

DESCRIPTION

Figure 1:
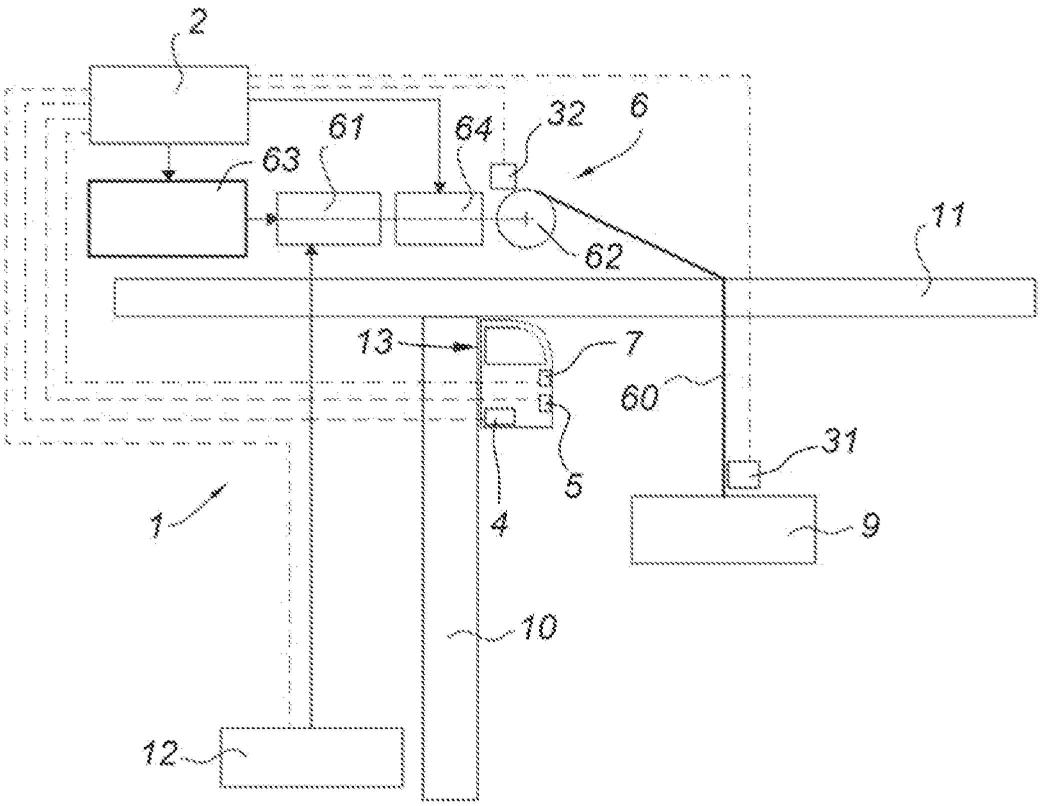
FIG. 1 is a schematic view of a crane according to an embodiment.

FIG. 1 schematically represents a crane 1, for example a tower crane type one, this crane 1 comprising a mast 10 and a dispensing jib 11 along which a trolley moves, under which the hanging load 9 hangs to a lifting rope 60 through a reeve block and a hook (not represented).

The crane 1 also comprises a lifting winch 6, comprising an electric motor 61, a reducer and a drum 62 around which is wound the lifting rope 60 coupled to the hanging load 9; the electric motor 61 drives in rotation the drum 62 in either direction, through the reducer, to wind or unwind the lifting rope 60, and therefore for lifting of the hanging load 9 when ascending (upwards) or descending (downwards).

The electric motor 61 of the lifting winch 6 is controlled by a frequency converter 63, serving as a speed driver. In turn, this electric motor 61 is powered with electrical energy by an electric power supply 12, which is constituted in particular by an electric distribution network.

The lifting winch 6 also comprises a motor brake 64, associated to the electric motor 61. The closure of the electric brake 64 immobilizes the rotation of the electric motor 61 and the drum 62, whereas the opening of this motor brake 64 authorizes the free rotation of the electric motor 61 and of the drum 62. In particular, turning on the electric motor 61 is accompanied with an opening of the motor brake 64, whereas stopping this electric motor 61 is accompanied with the closure of the motor brake 64.

The crane 1 also comprises a monitoring/control system 2 connected to the frequency converter 63 for a monitoring of the motor speed of the electric motor 61, whether when rising or descending, and thus a monitoring of the displacement speed of the hanging load 9, when rising or descending. This monitoring/control system 2 is also connected to the motor brake 64 to control opening/closure thereof.

The crane 1 also comprises a first measuring system 31 for measuring a mass parameter PM representative of a mass of the hanging load 9. This mass parameter PM may correspond to the mass of the hanging load 9, or still to another parameter that depends on the mass of the hanging load, such as for example a weight, a tension measured at the level of the lifting rope 60, a force measured for example at the level of the reeve block or the hook, a stretching of the lifting rope 60, etc.

The crane 1 also comprises a second measuring system 32 for measuring a lifting speed VL representative of the displacement speed of the hanging load 9, when rising or descending, and comprised within a speed range bound by a maximum speed VMAX. This lifting speed VL may correspond to the displacement speed of the hanging load 9, or else to another speed that depends on the displacement speed of the hanging load 9, such as for example a rotational speed of the drum 62, a speed setpoint, a motor speed, a speed of the lifting rope 60, etc. In a normal operation, without restraining the lifting speed VL, this lifting speed VL could vary from zero up to the maximum speed VMAX, this maximum speed VMAX being a manufacturer limit or a machine limit specific to the lifting winch 6. This maximum speed VMAX could vary with the mass parameter PM, and more particularly decrease with the mass parameter PM.

The monitoring/control system 2 is connected to both the first measuring system 31 and the second measuring system 32 so as to receive in real-time the measurement of the mass parameter PM and the measurement of the lifting speed VL.

The crane 1 integrates at least one emergency stop 4, placed for example in a control cabin 13 or on a remote-control or at the bottom of the mast 10 and which, once activated, shuts off at least the lifting winch 6 (in other words stops the electric motor 61) and stops lifting of the hanging load 9 and which, once deactivated, authorizes a reactivation of the lifting winch 6. This emergency stop 4 is connected to the monitoring/control system 2 which, upon activation of the emergency stop 4, shuts off the lifting winch 6. Of course, other electrical apparatuses may also be shut off upon activation of the emergency stop 4.

The crane 1 comprises an alarm system 5 configured to emit an alarm when activated. This alarm system 5 may be in the form of a visual display, for example at the level of a control interface placed in the control cabin 13 or of a remote interface, so that the alarm signal is a visual signal on this control interface. Alternatively or complementarily, this alarm system 5 may comprise a sound emitter, for example in the control cabin 13, so that the alarm signal is an audible signal. The alarm system 5 is connected to the monitoring/control system 2 which is configured to activate/deactivate the alarm system 5 in some conditions described later on.

The monitoring/control system 2 is configured to operate a monitoring of lifting during a descending of the hanging load 9 and during an ascending of the hanging load 9.

During a descending of the hanging load 9, the monitoring/control system 2 authorizes the lifting speed VL when descending over the entire speed range, in other words a pilot could control the lifting speed VL over the entire speed range up to the corresponding maximum speed VMAX for the measured mass parameter PM.

During an ascending of the hanging load 9, the monitoring/control system 2 is configured to perform a comparison of the lifting speed VL when ascending with a low threshold SB which varies according to the mass parameter PM, and with a high threshold SH which also varies according to the mass parameter PM, wherein this high threshold SH is higher than or equal to the low threshold SB and lower than or equal to the maximum speed VMAX.

Figure 2:
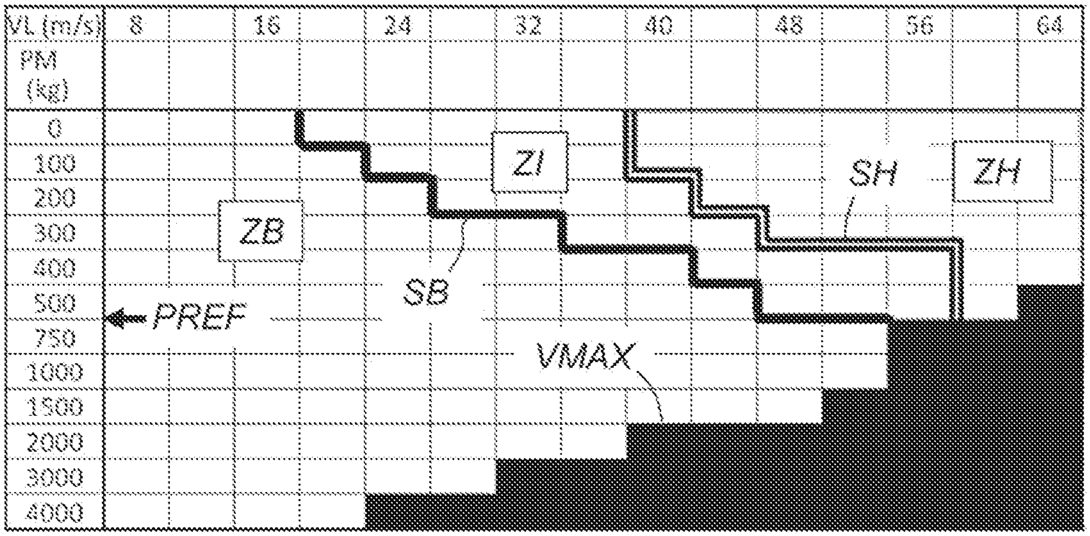
FIG. 2 is a table representing the variations of the low threshold and of the high threshold as a function of the mass parameter, with the three speed areas in the basic mode.
Figure 3:
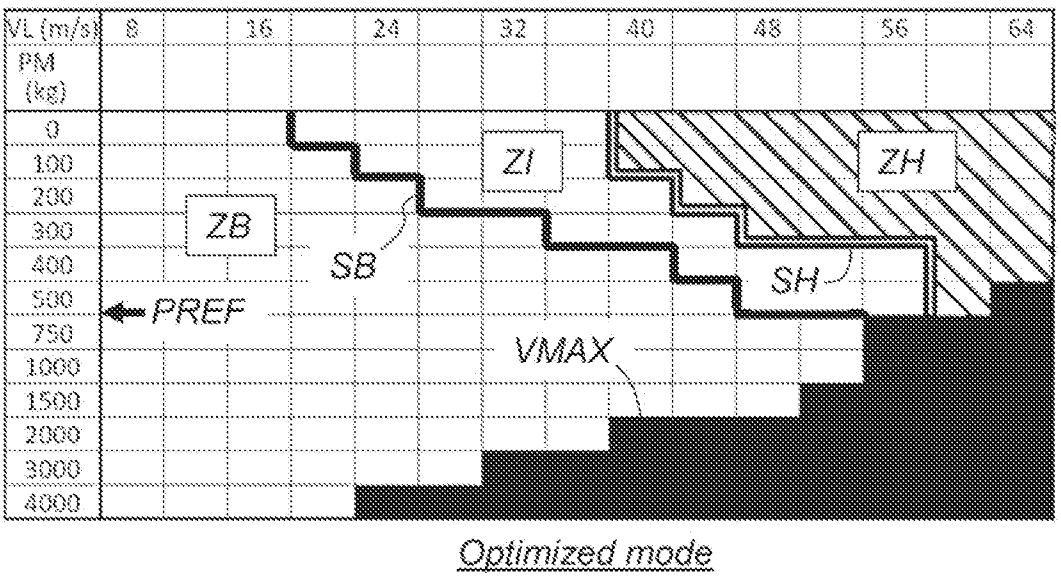
FIG. 3 is a table representing the variations of the low threshold and of the high threshold as a function of the mass parameter, with the three speed areas in the optimized mode.
Figure 4:
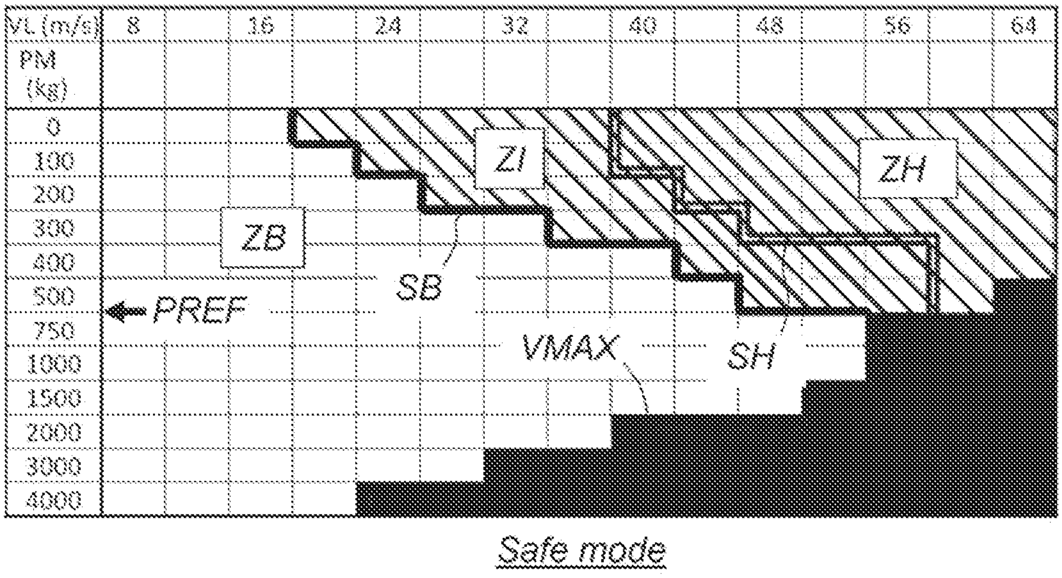
FIG. 4 is a table representing the variations of the low threshold and of the high threshold as a function of the mass parameter, with the three speed areas in the safe mode.

FIGS. 2-4 illustrate, in tables, an example of variations of a low threshold SB and of a high threshold SB, expressed in m/s (meter per second), as a function of the mass parameter PM expressed in kg (kilogram). The low threshold SB is schematized by a simple thick line, whereas the high threshold SH is schematized by a double thick line. In this example, when the mass parameter is lower than a definite reference value PREF, the low threshold SB and the high threshold SH are distinct and they increase with the mass parameter PM, and thus the low threshold SB is strictly lower than the high threshold SH. Moreover, when the mass parameter PM is higher than the reference value PREF, the low threshold SB and the high threshold SH are equal to the maximum speed VMAX which decreases with the mass parameter PM. In other words, beyond this reference value PREF, that is to say for very heavy loads, the monitoring/control system 2 imposes a reduction of the maximum speed VMAX, and the two thresholds SB, SH are equal to this maximum speed VMAX and therefore also decrease with the mass parameter PM. In this example, when the mass parameter PM is lower than the reference value PREF, the maximum speed VMAX is constant or constant within a 15% margin, and the high threshold SH is strictly lower than the maximum speed VMAX.

Thus, the variation curves of the low threshold SB, of the high threshold and of the maximum speed VMAX delimit three speed areas, a low area ZB below the low threshold SB, an intermediate area ZI between the low threshold SB and the high threshold SH, and a high area ZH between the high threshold SH and the maximum speed VMAX. The intermediate area ZI and the high area ZH stop beyond the reference value PREF, so that beyond this reference value PREF, only the low area ZB subsists.

The low threshold SB and the high threshold SH are established by modeling, simulation or actual testing of an abrupt stoppage of winding of a lifting rope 60 around the drum 62 (such a winding being associated to an ascending of the hanging load 9) for different lifting speeds VL when ascending and for different mass parameters PM, while differentiating the low threshold SB as a speed below which no faulty winding is observed and above which a faulty winding is observed, and the high threshold SH as a speed above which the observed faulty winding is very considerable (or major) and even non-recoverable, whereas between the low threshold SB and the high threshold SH the observed faulty winding is considerable (or minor) but recoverable through an operation of unwinding and re-winding the lifting rope 60.

During an ascending of the hanging load 9, three operating mode could be selected, in particular by means of a mode selector 7, disposed for example at the level of a control interface placed in the control cabin 13, so that the pilot (also called crane operator) could select an operating mode amongst the following three operating modes: a basic mode, an optimized mode and a safe mode.

Monitoring of lifting, by means of the monitoring/control system 2, is then operated in the selected operating mode. When monitoring lifting, the lifting speed VL when descending is authorized, to recall, over the entire speed range.

Referring to FIG. 2, in the basic mode, the monitoring/control system 2 controls the lifting winch 6 so that the lifting speed VL when ascending (in other words during an ascending of the hanging load 9) is authorized over the entire speed range, and therefore up to the maximum speed VMAX. Also, in the basic mode, the monitoring/control system 2 authorizes the lifting speed VL in the three speed areas ZB, ZI and ZH. Moreover, in this basic mode, the monitoring/control system 2 is configured to activate the alarm system 5 if the emergency stop 4 is activated during an ascending of the hanging load 9 and while the lifting speed VL when ascending is higher than the low threshold SB.

In other words, in the basic mode:

if the lifting speed VL when ascending is in the low area ZB at the time of activation of the emergency stop 4 which causes an abrupt stoppage of the ascending of the hanging load 9, then the alarm system 5 is not activated; and if the lifting speed VL when ascending is in the intermediate area ZI or in the high area ZH, at the time of activation of the emergency stop 4, then the alarm system 5 is activated to trigger an alarm suited to inform an operator (for example the pilot) on a risk of faulty winding.

In the basic mode, the alarm varies depending on whether the lifting speed VL when ascending is lower than the high threshold SH or is higher than the high threshold SH, in other words the alarm is not the same depending on whether the lifting speed VL when ascending is in the intermediate area ZB or in the high area ZH, at the time of activation of the emergency stop 4. In this manner, the operator will be informed with two distinct alarms that:

the faulty winding is potentially considerable (or minor) and recoverable in the case wherein the lifting speed VL when ascending is in the intermediate area ZI; or the faulty winding is potentially very considerable (or major) and even non-recoverable in the case wherein the lifting speed VL when ascending is in the high area ZH.

In the basic mode, once the emergency stop 4 is deactivated, whether rising or descending, the lifting speed VL is again authorized over the entire speed range, unless another operating mode is selected.

Referring to FIG. 3, in the optimized mode, the monitoring/control mode 2 controls the lifting winch 6 so that the lifting speed VL when ascending is authorized only below the high threshold SH and forbidden above the high threshold SH. Also, in the optimized mode, the monitoring/control system 2 authorizes the lifting speed VL when ascending only in the low area ZB and in the intermediate area ZI, and forbids the lifting speed VL when ascending in the high area ZH, which is schematized by hatches in the high area ZH in FIG. 3.

Moreover, in this optimized mode, the monitoring/control system 2 is configured to activate the alarm system 5 if the emergency stop 4 is activated during an ascending of the hanging load 9 and while the lifting speed VL when ascending is higher than the low threshold SB.

In other words, in the optimized mode:

if the lifting speed VL when ascending is in the low area ZB at the time of activation of the emergency stop 4, then the alarm system 5 is not activated; and if the lifting speed VL when ascending is in the intermediate area ZI, at the time of activation of the emergency stop 4, then the alarm system 5 is activated to trigger an alarm suited to inform the operator about a risk of faulty winding.

This alarm may be specific to the optimized mode, and therefore different from the alarms of the basic mode. It is also possible to consider this alarm of the optimized mode being equivalent to the alarm of the basic mode triggered when the lifting speed VL when ascending is in the intermediate area ZI.

Thus, with this optimized mode, the high area ZH is forbidden so that there is no risk of a major, or possibly non-recoverable, faulty winding. On the contrary, the intermediate area ZI is authorized, so that if the lifting speed VL when ascending is in the intermediate area ZI at the time of activation of the emergency stop 4, then the operator will be informed by an alarm about a risk of faulty winding, which is potentially minor and recoverable.

In the optimized mode, once the emergency stop 4 is deactivated, there are two possibilities:

if the lifting speed VL when ascending was lower than the low threshold SB (in other words in the low area ZB) at the time of activation of the emergency stop 4, the lifting speed VL when ascending is again authorized below the high threshold SH and forbidden above the high threshold SH (in other words is authorized in the low area ZB and in the intermediate area ZI, and forbidden in the high area ZH), unless another operating mode is selected;

if the lifting speed VL when ascending was higher than the low threshold SB (in other words in the intermediate area ZI) at the time of activation of the emergency stop 4, the lifting speed VL, when rising and optionally also when descending, is limited to a reduced speed VRED, until a winding condition is met, such a winding condition being representative of a wound/unwound state of the lifting rope 60 around the drum 62.

The interest of restraining the lifting speed VL when ascending to the reduced speed VRED (in other words the lifting speed VL when ascending cannot exceed the reduced speed VRED) is to impose low-speed operations for rewinding the lifting rope 60 around the drum 62 to recover the faulty winding.

Optionally, the lifting speed VL when descending is also restrained to the reduced speed VRED (in other words the lifting speed VL when descending cannot exceed the reduced speed VRED) to impose low-speed operations for unwinding the lifting rope 60 to recover the faulty winding.

The winding condition depends on the lifting speed VL when ascending at the time of activation of the emergency stop 4. Indeed, the faulty winding increases with the lifting speed VL when ascending at the time of activation of the emergency stop 4.

The winding condition also depends on the mass parameter PM. Indeed, the faulty winding decreases with the mass parameter PM measured at the time of activation of the emergency stop 4, because the heavier the hanging load 9 and the more it applies an increased tension on the lifting rope 60, the less the risk of faulty winding will be.

Advantageously, the winding condition is met once the lifting rope 60 is unwound by a definite unwound length LDER after deactivation of the emergency stop 4. Hence, this unwound length LDER also depends on the lifting speed VL when ascending at the time of activation of the emergency stop 4 and/or on the mass parameter PM.

Monitoring of the winding condition could be operated in an automated manner (by means of a sensor or an automatic monitoring of the unwound length LDER) and/or visually by an operator.

In the optimized mode, once the winding condition is met, the monitoring/control system 2 ensures controls so that:

the alarm of the alarm system 5 is deactivated;

the lifting speed VL when ascending is again authorized only below the high threshold SH and forbidden above the high threshold SH, unless another operating ode is selected;

the lifting speed VL when descending is again authorized over the entire speed range, in the case wherein the lifting speed VL when descending was limited to the reduced speed VRED.

This reduced speed VRED may be lower than the low threshold SB (as associated to the mass parameter PM of the hanging load 9) and/or be comprised between 0.1 and 0.6 times the maximum speed, and for example between 0.2 and 0.4 times the maximum speed.

Alternatively, in the optimized mode, once the emergency stop 4 is deactivated, there is only one possibility: regardless of whether the lifting speed VL when ascending was lower or higher than the low threshold SB at the time of activation of the emergency stop 4, the lifting speed VL when ascending is again authorized below the high threshold SH and forbidden above the high threshold SH (in other words is authorized in the low area ZB and in the intermediate area ZI, and forbidden in the high area ZH), unless another operating mode is selected. In other words, in this variant, there is no reduced speed or winding condition, and there is essentially the alarm for warning the operator about a risk of faulty winding.

Referring to FIG. 4, in the safe mode, the monitoring/control system 2 controls the lifting winch 6 so that the lifting speed VL when ascending is authorized only below the low threshold SB and forbidden above the low threshold SB. Also, in the safe mode, the monitoring/control system 2 authorizes the lifting speed VL when ascending only in the low area ZB, and forbids the lifting speed VL when ascending in the intermediate area ZI and in the high area ZH, which is schematized by hatches in the intermediate area ZI and in the high area ZH in FIG. 4.

In this safe mode, if the emergency stop 4 is activated during an ascending of the hanging load 9, the monitoring/control system 2 does not activate any alarm by means of the alarm system 5, because there is no risk of faulty winding below the low threshold SB. Once the emergency stop 4 is deactivated, the lifting speed VL when ascending is again authorized below the low threshold SB and forbidden above the low threshold SB, unless another operating mode is selected.

The invention claimed is:

1. A control method for controlling lifting of a hanging load with a lifting winch integrating a drum on which is wound a lifting rope coupled to the hanging load, the control method comprising:

- measuring of a mass parameter representative of a mass of the hanging load;
- measuring of a lifting speed representative of a displacement speed of the hanging load, when ascending or descending, and comprised within a speed range bound by a maximum speed;
- supervising an emergency stop which, once activated, shuts off at least the lifting winch and stops lifting of the hanging load and which, once deactivated, authorizes a reactivation of the lifting winch;
- during an ascending of the hanging load, comparing the lifting speed when ascending with a low threshold which varies according to the mass parameter, and with a high threshold which also varies according to the mass parameter, the high threshold being higher than or equal to the low threshold and lower than or equal to the maximum speed; and
- monitoring of the lifting in an optimized mode in which the lifting speed when ascending is authorized only below the high threshold and forbidden above the high threshold, and if the emergency stop is activated during an ascending of the hanging load and while the lifting speed when ascending is higher than the low threshold then an alarm is activated.

2. The lifting method according to claim 1, wherein, in the optimized mode, once the emergency stop is deactivated, and if the lifting speed when ascending was higher than the low threshold at the time of activation of the emergency stop, then the lifting speed when ascending, and also optionally the lifting speed when descending, is limited to a reduced speed, lower than the high threshold, until a winding condition is met, the winding condition being representative of a wound/unwound state of the lifting robe around the drum.

3. The lifting method according to claim 2, wherein the winding condition depends on the lifting speed when ascending at the time of activation of the emergency stop.

4. The lifting method according to claim 3, wherein the winding condition is met once the lifting cable is unwound by a definite unwound length after deactivation of the emergency stop.

5. The lifting method according to claim 4, wherein the unwound length depends on at least one of the following parameters among the lifting speed when ascending at the time of activation of the emergency stop and the mass parameter.

6. The lifting method according to claim 2, wherein, once the winding condition is met in the optimized mode, the alarm is deactivated.

7. The lifting method according to claim 2, wherein, once the winding condition is met in the optimized mode, the lifting speed when ascending is again authorized only below the high threshold and forbidden above the high threshold, unless another operating mode is selected.

8. The lifting method according to claim 1, wherein, when the mass parameter is lower than a definite reference value, the low threshold and the high threshold are distinct and they increase with the mass parameter.

9. The lifting method according to claim 8, wherein, when the mass parameter is higher than the reference value, the low threshold and the high threshold are equal, they decrease with the mass parameter.

10. The lifting method according to claim 9, wherein the maximum speed varies according to the mass parameter and, when the mass parameter is higher than the reference value, the maximum speed decreases with the mass parameter and the low threshold and the high threshold are equal to this maximum speed.

11. The lifting method according to claim 8, wherein, when the mass parameter is lower than the reference value, the maximum speed is constant or constant within a 15% margin and the high threshold is strictly lower than the maximum speed or is equal to the maximum speed.

12. The lifting method according to claim 1, wherein the reduced speed, in the optimized mode, is lower than the low threshold.

13. The lifting method according to claim 1, wherein the reduced speed, in the optimized mode, is comprised between 0.1 and 0.6 times the maximum speed, and for example between 0.2 and 0.4 times the maximum speed.

14. The lifting method according to claim 1, wherein the alarm is in the form of a visual or audible alarm signal on a control interface.

15. The lifting method according to claim 1, comprising a step of selecting an operating mode amongst the optimized mode and a basic mode in which the lifting speed when ascending is authorized over the entire speed range, and if an emergency stop is activated during an ascending of the hanging load and while the lifting speed when ascending is higher than the low threshold then an alarm is activated;

and the monitoring of the lifting is performed in the selected operating mode.

16. The lifting method according to claim 15, wherein, in the basic mode, the alarm varies depending on whether the lifting speed when ascending is lower than the high threshold or is higher than the high threshold at the time of activation of the emergency stop.

17. The lifting method according to claim 1, comprising a step of selecting an operating mode amongst the optimized mode and a safe mode in which the lifting speed when ascending is authorized only below the low threshold and forbidden above the low threshold is performed;

and the monitoring of the lifting is performed in the selected operating mode.

18. The lifting method according to claim 1, wherein, during monitoring of the lifting, the lifting speed when descending is authorized over the entire speed range.

19. A lifting or transport apparatus comprising a lifting winch integrating a drum on which is wound a lifting rope coupled to a hanging load for lifting of the hanging load, the lifting or transport apparatus comprising:

a first measuring system for measuring a mass parameter representative of a mass of the hanging load;

a second measuring system for measuring a lifting speed representative of a displacement speed of the hanging load, when ascending or descending, and comprised within a speed range bound by a maximum speed;

an emergency stop which, once activated shuts off at least the lifting winch and stops lifting of the hanging load and which, once deactivated, authorizes a reactivation of the lifting winch;

an alarm system configured to emit an alarm when activated;

a monitoring/control system connected to the first measuring system, to the second measuring system, to the lifting winch, to the alarm system and to the emergency stop, the monitoring/control system being configured to perform, during an ascending of the hanging load, a comparison of the lifting speed when ascending with a low threshold which varies according to the mass parameter, and with a high threshold which also varies according to the mass parameter, the high threshold being higher than or equal to the low threshold and lower than or equal to the maximum speed; and wherein the monitoring/control system is configured, in an optimized mode, to control the lifting winch so that the lifting speed when ascending is authorized only below the high threshold and is forbidden above the high threshold, and to activate the alarm system if the emergency stop is activated during an ascending of the hanging load and while the lifting speed when ascending is higher than the low threshold.

20. The lifting or transport apparatus according to claim 19, wherein the monitoring/control system is configured, in the optimized mode and once the emergency stop is deactivated, to control the lifting winch so that the lifting speed, whether when ascending or descending, is limited to a reduced speed, lower than the high threshold, until a winding condition is met, the winding condition being representative of a wound/unwound state of the lifting cable around the drum.

21. The lifting or transport apparatus according to claim 19, comprising a mode selector for selecting an operating mode amongst the optimized mode and a basic mode in which the monitoring/control system controls the lifting winch so that the lifting speed when ascending is authorized over the entire speed range, and for activating the alarm system if an emergency stop is activated during an ascending of the hanging load and while the lifting speed when ascending is higher than the low threshold.

22. The lifting or transport apparatus according to claim 19, comprising a mode selector to select an operating mode amongst the optimized mode and a safe mode in which the monitoring/control system controls the lifting winch so that the lifting speed when ascending is authorized only below the low threshold and forbidden above the low threshold.

* * * * *